United States Patent [19]
DeChurch

[11] Patent Number: 5,185,594
[45] Date of Patent: Feb. 9, 1993

[54] TEMPERATURE SENSING CABLE DEVICE AND METHOD OF MAKING SAME

[75] Inventor: Robert M. DeChurch, Canfield, Ohio
[73] Assignee: Furon Company, Aurora, Ohio
[21] Appl. No.: 703,282
[22] Filed: May 20, 1991
[51] Int. Cl.$^5$ .......................... G08B 17/06; H01C 3/04
[52] U.S. Cl. ........................................ 340/596; 338/26
[58] Field of Search ............... 340/596, 590, 597, 664; 338/26; 374/120

[56] References Cited

U.S. PATENT DOCUMENTS

| | | | |
|---|---|---|---|
| 2,483,793 | 10/1949 | Thomas | 340/577 X |
| 2,941,192 | 6/1960 | Postal | 340/577 |
| 3,243,753 | 3/1966 | Kohler | 338/31 |
| 3,823,217 | 7/1974 | Kampe | 264/105 |
| 3,861,029 | 1/1975 | Smith-Johannsen et al. | 29/611 |
| 3,914,363 | 10/1975 | Bedard et al. | 264/105 |
| 3,976,600 | 8/1976 | Meyer | 252/511 |
| 4,023,412 | 5/1977 | Luke et al. | 340/597 X |
| 4,200,973 | 5/1980 | Farkas | 29/611 |
| 4,277,673 | 7/1981 | Kelly | 219/528 |
| 4,327,480 | 4/1982 | Kelly | 29/611 |
| 4,352,083 | 9/1982 | Middleman et al. | 338/23 |
| 4,388,607 | 6/1983 | Toy et al. | 338/225 D |
| 4,400,614 | 8/1983 | Sopory | 219/528 |
| 4,444,708 | 4/1984 | Gale et al. | 264/105 |
| 4,543,474 | 9/1985 | Horsma et al. | 219/553 |
| 4,547,658 | 10/1985 | Crowley | 219/539 |
| 4,560,524 | 12/1985 | Smuckler | 264/105 |
| 4,575,620 | 3/1986 | Ishii et al. | 219/549 |
| 4,724,417 | 2/1988 | Au et al. | 338/22 R |
| 4,910,391 | 3/1990 | Rowe | 219/549 |
| 4,941,753 | 7/1990 | Wickramasinghe | 374/120 |
| 5,057,673 | 10/1991 | Farkas et al. | 219/549 |
| 5,122,641 | 6/1992 | DeChurch | 219/548 |

OTHER PUBLICATIONS

Sichel, Ed., *Carbon Black-Polymer Composites, the Physics of Electrically Conducting Composites,* Marcel Dekker, Inc., N.Y. 1982, pp. 51-77.

Primary Examiner—Jin F. Ng
Assistant Examiner—Thomas J. Mullen, Jr.
Attorney, Agent, or Firm—Fay, Sharpe, Beall, Fagan, Minnich & McKee

[57] ABSTRACT

A continuous temperature sensing cable formed of a polymer containing conductive and semi-conductive fillers such as polyethylene with carbon black, powdered metals and metal oxides controlled within the range of from about eight percent (8%) to about fifteen percent (15%). The composition is extruded with a pair of elongated substantially parallel conductors which are spaced apart along the longitudinal length of the cable. The conductors are single endedly connected to a control/alarm device for monitoring the continuous length of the temperature sensing cable. The control/alarm device may be a time domain reflectometer TDR for accurate determination of localized discontinuities caused by high temperatures along the length of the temperature sensing cable. Alternatively, a critical voltage may be applied single-endedly to the conductors and serially connected to an audible alarm to detect tunneling conduction when operated at a temperature near the melt temperature of the composition.

22 Claims, 6 Drawing Sheets

NO VOLTAGE OR ANY VOLTAGE APPLIED

FIG. 4B
(PRIOR ART)

PTC TECHNOLOGY NOT CROSSLINKED

ANNEALED
LOW VOLTAGE

FIG. 6A

ANNEALED
CRITICAL VOLTAGE

TEMPERATURE SENSING CABLE DEVICE AND METHOD OF MAKING SAME

BACKGROUND OF THE INVENTION

This invention pertains to the art of temperature sensing cable apparatus and more particularly to temperature sensitive cable extrudates using polymers containing conductive and semi-conductive fillers. The invention is specifically applicable to continuous fire alarm cable systems for use with residential and commercial buildings or the like. It will be appreciated, though, that the invention has broader applications such as industrial manufacturing processes and other overheat detecting systems.

Fire alarm cabling and flame detecting devices typically include at least one pair of longitudinal electrical conductors impregnated within the cable itself. Thomas, in U.S. Pat. No. 2,483,793 discloses a fire alarm cable of the type broadly described above but further including short alternating readily combustible and non-combustible lengths of insulation. Low voltage current, derived from a step-down transformer, is provided at one node to a single common longitudinal conductor which extends throughout the length of the alarm cable. The other node of the stepdown transformer is connected first to an audible alarm or bell and then, in turn, to a plurality of insulated longitudinal conductors which are made to lie in parallel with the common conductor for the length of the cable. Upon the occurrence of a fire, a portion of the cable is made to be consumed by the flames in order to melt and eventually sever the common conductor which in turn droops making contact with at least one of the plurality of parallel insulated wires. Such construction may be used to provide a crude estimation of an approximate location of the fire causing an alarm. However, the manufacture of such cable is difficult and the costs involved are accordingly high.

A flame and overheat detecting system is described in Postal U.S. Pat. No. 2,941,192. The cabling described there has an exterior protective metal sheath as of nickel-iron, a center longitudinal wire as of copper-clad nickel-iron, and a temperature-responsive electronic semiconductor filler material between the sheath and the longitudinal center wire. The filler material is essentially an insulator at low temperatures and a conductor at overheat or flame temperatures. The semi-conductive materials may comprise p-type semiconductors, including oxides of CO, Mn, Ni, Cr, and Cu, and the n-type semiconductors, including the oxides of Ti, Fe, or Ba, as well as mixtures thereof. Although such cabling has met with limited success, the complicated fabricating techniques involved, including the step of heating the cable to sinter the semi-conductive material for adequate electrical contact between the components and to reduce the oxygen content of the semiconductor to achieve the level of resistivity desired, has contributed to a higher overall cost.

Middleman, et al. in U.S. Pat. No. 4,352,083 discloses circuit protection devices having two columnar electrodes and a conductive polymer element, a part of which is a PTC element. The Middleman, et al. devices comprising PTC elements have been proposed to protect circuits against fault conditions arising from excessive temperatures and/or circuit currents. In general, electrical heaters comprising PTC elements used in this manner operate in a positive temperature coefficient range of electrical resistance. A material exhibits the positive temperature coefficient of electrical resistance when the electrical resistance of the material increases as the temperature of the material increases. The increase in temperature may be a result of either rise in ambient temperature surrounding the composition or by reason of resistive heating caused by the passage of electrical current through the composition. In this manner, current delivered to electronic circuits of the like may be regulated in order to protect those circuits against fault conditions. A material exhibits a negative temperature coefficient of electrical resistance when the electrical resistance of the material decreases as the temperature of the material increases.

The Middleman, et al. devices operate exclusively in the PTC region and are formed having constricted intermediate portions of relatively small cross-section to avoid the creation of localized "hot zones" as large proportions of the voltage drop of the PTC element nearly always takes place over a very small portion of the element.

Self-regulating electrically semi-conductive compositions, in the form of extruded flexible electrical cables, are often used in resistive heating, heat sensing, and circuit-breaking applications. For example, heating cables incorporating these compositions may be used for freeze protection of pipes and for maintenance of flow characteristics of viscous fluids in pipes and storage containers.

A popular class of self-regulating compositions which exhibit positive temperature coefficients of resistance are thermoplastic compositions comprising electrically conductive particles, such as carbon black, dispersed throughout a polymeric base. The resulting composition may be viewed as a polymeric matrix foundation within which is located an interconnected array of conductive channels formed from these carbon particles.

It has been theorized that the positive temperature coefficient of electrical resistance behavior of these compositions over a limited region of operation is caused by the expansion of the polymeric matrix at a rate which is greater than the rate of expansion of the conductive channels. The expansion of the polymeric matrix causes an increase, or other alteration, of the spacial relationship between the electrically conductive particles in a manner which causes the electrical resistance of the polymeric composition to increase. This increase in the electrical resistance (R) of the polymeric composition, for a fixed electrical potential (V) placed across the composition, causes the electrical current (I) passing through the composition to be reduced. Thus, the amount of heat generated by the passage of the electrical current through the resistive composition, given by relationship that heat (power dissipated) equals $I^2R$, or equivalently, $V^2/R$, is also reduced. Conversely, a decrease in the temperature of the matrix causes the matrix to contract, which places the conductive particles or channels in closer proximity to one another. This reduced spacing between conductive channels decreases the electrical resistance (R) of the polymeric composition which, in turn, causes the electrical current (I) to increase with a corresponding increase in heat generation.

An alternate theory, which does not depend on the expansion and contraction of the polymeric composition, explains the positive temperature coefficient of electrical resistance region of operation in terms of the amount of crystallinity present in the polymeric composition. According to this theory, the increase in the electrical resistance of the composition as the temperature of the composition increases may arise as a result of the reorientation of the crystalline-amorphic boundaries within the polymeric composition. This reorientation of the boundaries tends to electrically insulate the conductive particles (or groups of electrically conductive particles) from one another. The more effective insulation of the individual conductive components of the composition on the microscopic level contributes to the increase of electrical resistance of the composition on the macroscopic level.

Additional information on the general theory of how extruded semi-conductive polymers work may be found in Farkas U.S. Pat. No. 4,200,973 entitled "METHOD OF MAKING SELF-TEMPERATURE REGULATING ELECTRICAL HEATING CABLE"; Bedard, et al. U.S. Pat. No. 3,914,363 entitled "METHOD OF FORMING SELF-LIMITING CONDUCTIVE EXTRUDATES"; Kampe U.S. Pat. No. 3,823,217 entitled "RESISTIVITY VARIANCE REDUCTION"; Farkas, et al. U.S. Pat. No. 5,057,673 entitled "SELF-CURRENT-LIMITING DEVICES AND METHOD OF MAKING SAME".

The disclosure of each of the patents and all other materials referred to above is incorporated by reference herein.

Methods of making polymeric compositions of the type described above generally comprise a variety of process steps. The method steps often include: extruding the mixed compositions; applying shape retaining jackets to the compositions; annealing the compositions at or above their melt point temperatures; cross-linking the polymeric components with radiation; and, lastly annealing a second time. These steps, in a variety of combinations, are typical of procedures used in the production of semi-conductive polymeric compositions containing amount of carbon black ranging from less than about ten percent (10%) to greater than about seventy-five percent (75%) of the total weight of the composition. In most cases, the first annealing step takes up to twenty four hours after which the composition is radiated to cross-link the polymeric components. A post-irradiation annealing step may be selectively employed to further relax the polymeric matrix to achieve thermal stability and achieve electrical volume resistivities at room temperature in the range of from about five to one-hundred thousand ohm-cm. These steps, and the additional time required to perform the steps, further add costs to the end product. More importantly, the additional expenditures in performing the steps after extrusion are solely directed to improving the positive temperature coefficient characteristics of the polymeric compositions within which range the prior devices are confined to operate.

Accordingly, it has been deemed desirable to produce a cost-effective temperature sensing cable which is, easy to manufacture without regard for good PTC characteristics, with an ability to identify an overheat event and its location, and operable in a region of NTC.

SUMMARY OF THE INVENTION

The present invention contemplates a new and improved continuous temperature sensing cable construction which overcomes the above-referenced problems. The embodiments of the invention provide consumers of the cable with the ability to sense an overheat condition, as well as the location of the overheat event, along the length of the cable where sections of the cable operate in a NTC region caused by ambient heat and applied voltage.

According to the present invention, an extruded polymer containing conductive and semi-conductive fillers is provided.

According to a more limited aspect of the invention, the continuous temperature sensing cable comprises at least a pair of longitudinal conductors throughout the length of the cable, the conductors being in electrical communication by means of the polymer comprising the cable According to another aspect of the invention, a time domain reflectometer is in electrical communication with the at least one pair of conductors impregnated within the polymer comprising the cable to locate disturbances along the cable length.

According to yet another aspect of the invention, the extruded polymer containing conductive and semi-conductive fillers includes polyethylene with carbon black, powdered metals, or metal oxides. The extruded composition may be placed in service immediately with no further processing or may be subsequently annealed.

A primary advantage of the invention resides in the ability to detect flame and overheat conditions over the continuous length of the temperature sensing cable. The detection intelligence need only communicate with the cable at a single end.

Another advantage of the invention is found in the ability to pinpoint the location of the overheat condition through time domain reflectometry.

Still another advantage of the invention is realized by the cost savings due to the ease of manufacture.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENT

Referring now to the drawings, wherein showings are for purposes of illustrating the preferred embodiment of the invention only and not for purposes of limiting same, the FIG. S show a continuous elongate temperature sensing cable and methods of making and using same.

Figure 1:
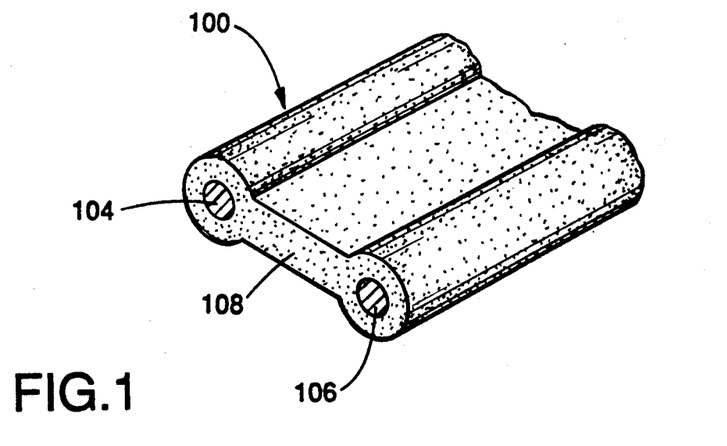
FIG. 1 shows a fragmented perspective view of a preferred construction of the invention having a barbell type transverse cross-section and having two elongated substantially parallel spaced-apart electrical conductors.

More particularly with reference to FIG. 1, an embodiment of the invention in the form of a continuous temperature sensing cable 100 having a generally bar-bell shaped transverse cross-section is illustrated. The cable 100 comprises a pair of elongated substantially parallel conductors 104 and 106, which are spaced apart along the longitudinal length of the cable 100. The conductors 104 and 106 are electrically interconnected by means of an extruded composition 108 made and processed in accordance with the invention.

It is apparent that use of a wide variety of constructions different from the preferred bar-bell shape illustrated, are possible including, for example, the teachings taught by Horsma, et al. in U.S. Pat. No. 4,543,474, without departing from the spirit and scope of the instant invention.

In the preferred embodiment, the composition is a polymer extrudate containing conductive and semi-conductive fillers, for example polyethylene with carbon black, powdered metals, or metal oxides. The level of the filler is dependent on the processing conditions. The processing/compounding affects the overall electrical characteristics of the construction.

Preferred materials for the conductors 104 and 106 are suitable alloys of copper or aluminum having low electrical resistance. However, other materials such as nickel-chromium alloys, commonly known as nichrom, may be used. The conductors are typically uncoated or conductively coated solid or stranded wire, preferably ranging in size from about 10 AWG to about 22 AWG. While the conductors 104, 106 shown in FIG. 1 are rod shaped, it is to be understood that the conductors may have any cross-sectional shape suitable for the intended application of a particular temperature sensing cable.

It is preferred that the conductors be made from metallic materials, however, they may be made from non-metallic materials or from a combination of metallic and non-metallic materials. Regardless of the material from which the conductors are made, it is desirable that the electrical resistance of the conductors 104, 106 be ordes of magnitude lower than the electrical resistance of the composition 108. This enables the control electronics connected to the construction to sense virtually an open circuit in the absence of an overheat condition along the length of the temperature sensing cable and a closed circuit when a portion of the cable is exposed to a high temperature.

Semi-conductive composition 108 is disposed between conductor 104 and conductor 106 and provides electrical interconnection therebetween. In one embodiment, the composition 108 is an extruded, flexible polymer material, exhibiting a negative temperature coefficient of electrical resistance. One material which is known to have all these characteristics comprises one or more polymeric components within which is dispersed a controlled amount of electrically conductive particles, such as carbon black, powdered metals, or metal oxides.

It is preferred that the electrically-conductive component of the composition 108 comprise carbon particles, such a carbon black or graphite. One such commercially available carbon black material is a highly electrically-conductive ferrous black called Vulcan XC-2, which is sold by Cabot Corporation. However, the conductive component may also be blended to be partially metallic in nature, such as through the addition of zinc oxide. In one embodiment, it is preferred that the amount of electrically-conductive carbon particles present in the composition 108 be controlled within the range of from about eight percent (8%) to about fifteen percent (15%) by weight to the total weight of the composition.

The polymeric components of the semi-conductive composition 108 include homopolymers or copolymers of crystalline materials such as, for example, polyethylene, polypropylene, and ETFE such as Tefzel sold by I. E. DuPont, or Viton, and blends thereof. Generally the semi-conductive composition 108 contains one or more melt-processable crystalline and/or semi-crystalline polymeric materials which may be combined with suitably selected amorphous and/or elastomeric polymeric materials, provided that the completed compositions remain melt-processable. Additionally, the crystalline properties of the particular polymer or combination of polymers used in making the semi-conductive composition determines the controlling temperature about which the composition will begin to conduct electrical current. In one embodiment of the present invention, the crystalline melt-processable components of the semi-conductive composition 108 include polyethylene, carbon black, zinc oxide, and ethylene-vinyl acetate. One commercially available polymer is Union Carbide DGDK-3364 polyethylene. One commercially available EVA is Elvax. Both of these materials have been used to practice the invention. It will be understood, however, that other comparable materials may also be used to practice the invention.

Additives such as fillers, anti-oxidants, heat stabilizers, flame deterrents, processing aids, and the like, may be included in the semi-conductive composition to provide physical, chemical, and other characteristics desired in the final product.

Figure 2:
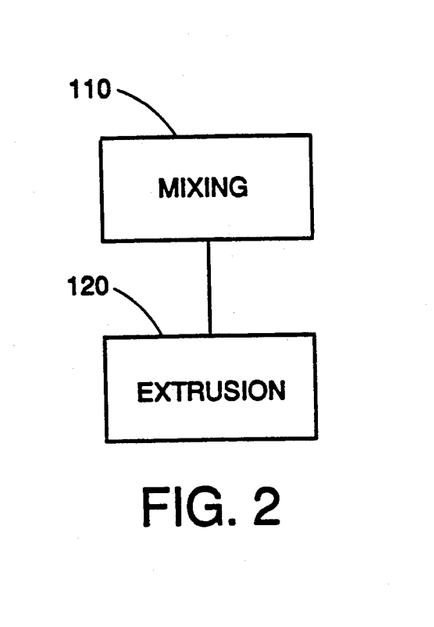
FIG. 2 is a block diagram showing an improved method by which a continuous temperature sensing cable may be produced in accordance with the present invention.

One method by which the heat sensing cable 100 may be made is illustrated by the block diagram shown in FIG. 2. The method comprises a mixing step 110 wherein a batch of polymeric components and conductive particles are combined to create a mixture, and an extrusion step 120 wherein the composition 108 is extruded around the conductors 104 and 106. The finished continuous temperature sensing cable 100 is thereby produced having the desirable electrical and physical characteristics according to the discussion below.

Within the mixing step 110, the hereinbefore described polymeric components, conductive particles, and additives comprising the composition 108 are uniformly mixed and blended using normal polymer mixing techniques. One such device commonly used for the process is a Banbury Mixer. Although it is preferred that the components be mixed and blended in conjunction with sufficient heat to promote uniform distribution of the conductive particles, it is also possible that some compositions be dry blended. In general, any mixing and blending technique which uniformly disperses the conductive particles throughout the polymeric materials may be used including cryogenic methods as disclosed in U.S. patent application Ser. No. 527,527, filed May 23, 1990, now U.S. Pat. No. 5,122,641 incorporated herein by reference.

In making the continuous temperature sensing cables utilizing the method of the present invention, it is preferred that the composition be extruded as represented by the step 120 in FIG. 2. Extrusion provides economic savings and other advantages associated with the capability of producing long, continuous lengths of material. It will be understood, however, that other methods of forming the composition of the conductors, such as casting, may also be used.

After mixing the ingredients of the temperature sensing composition and extruding the composition to form a finished cable, the final product is thereby completed for connection with an intelligent electronic controller or other apparatus for signaling a fault condition along the length of the continuous cable as will be described below.

Figure 3:
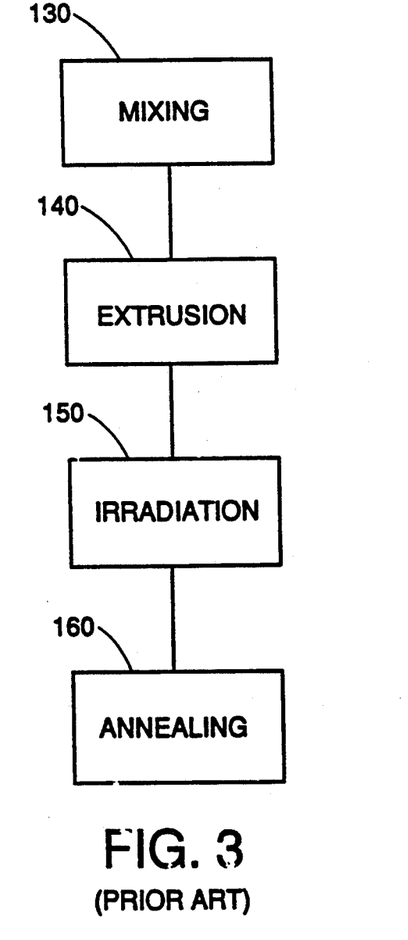
FIG. 3 is a block diagram showing a method for making self-regulated positive temperature coefficient materials as described in detail in U.S. patent application Ser. No. 196,146 entitled "SELF-CURRENT-LIMITING DEVICES AND METHOD OF MAKING SAME", the disclosure of which is hereby incorporated by reference herein.

FIG. 3 illustrates by means of a block diagram the basic steps of the process by which a typical positive temperature coefficient (PTC) cable construction is formed for use in applications including resistive heating, heat sensing, and circuit breaking. Prior to extruding the material in step 140, the polymeric components are first mixed with electrically-conductive carbon particles in a mixing step 130. Generally, it is preferred that the amount of electrically-conductive carbon particles present in the composition be controlled within the range of from about fifteen percent (15%) to about twenty percent (20%) by weight to the total weight of the composition. The extruded composition is next subjected to ionizing radiation sufficient in strength to cross-link the polymeric matrix containing the carbon black particles. The cross-linking by irradiation is represented by step 150 in FIG. 3. The cross-linking imparts a degree of thermal stability requisite to the particularly intended application without unduly diminishing the crystallinity of the polymeric matrix.

The extruded and cross-linked semi-conductive finished construction is annealed in step 160 at a temperature that is at or above the melt point temperature of the composition for a period of time sufficient to effect the electrical characteristics desired. Typical annealing temperatures range from approximately 140° C. to approximately 250° C. According to the teachings of Farkas, et al. in U.S. Pat. No. 5,057,673, the composition is heated to the required annealing temperature and held at that temperature for a time period ranging from a few minutes to in excess of forty hours, depending upon the particular composition being annealed.

Figure 4A:
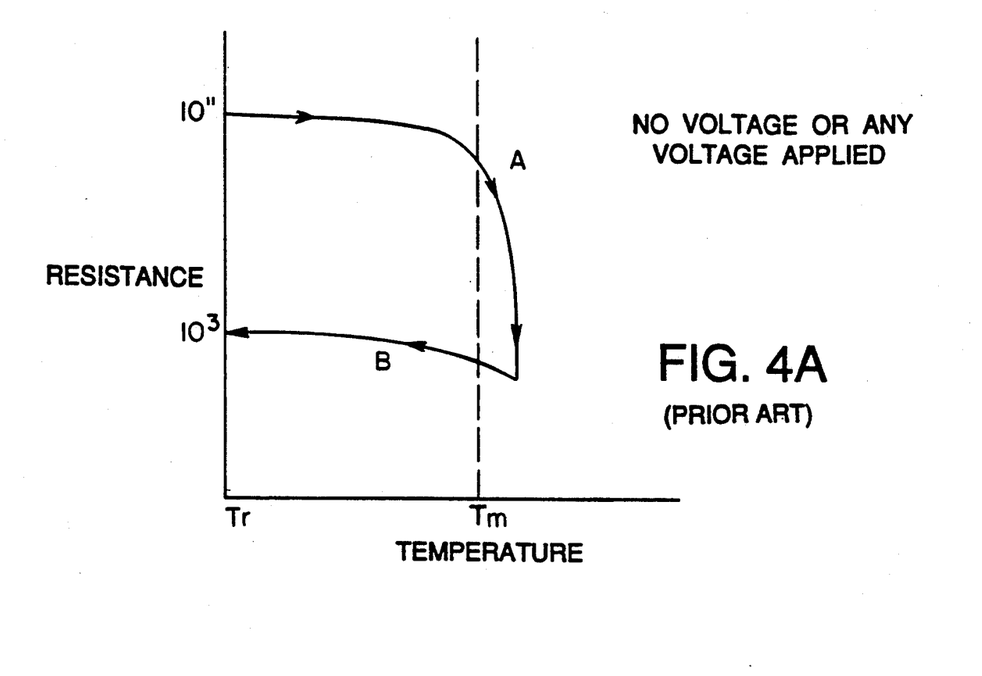
FIGS. 4a and 4b are graphs of the electrical characteristics of a typical self-regulating positive temperature coefficient material made in accordance with the process illustrated in FIG. 3.
Figure 4B:
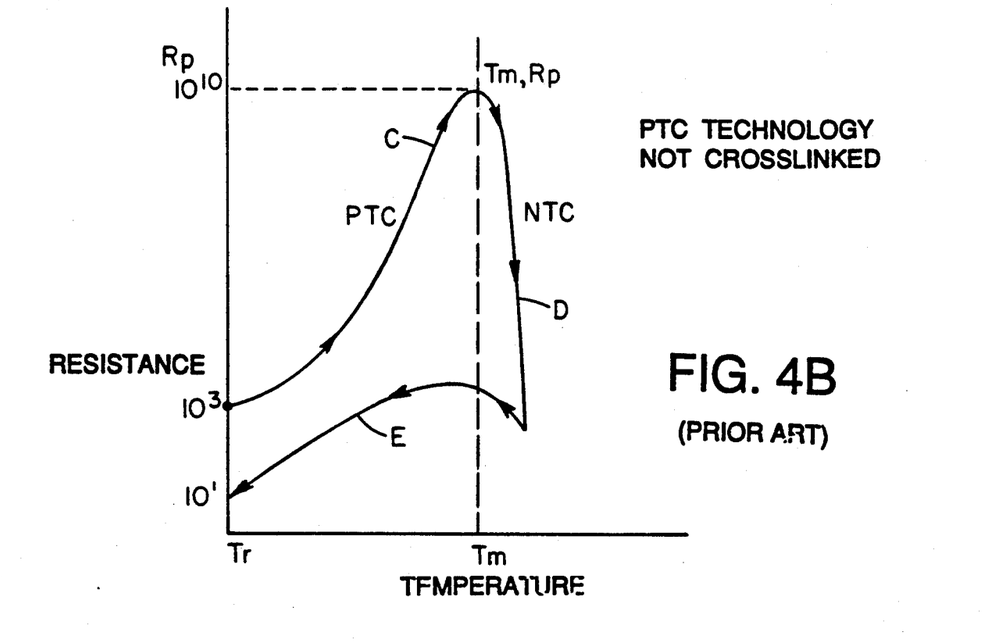

Next, referring to FIGS. 4a and 4b, a typical electrical characteristic behavior of the composition formed using the method of FIG. 3 is illustrated. For FIGS. 4-7, the ordinate is a logarithmic scale of the linear resistance of the cable and the abscissa is a linear scale of the system temperature. It is well documented that an extruded semi-conductive polymer will, upon heating it above its melting point, become more conductive. This phenomenon has been documented as being an irreversible process. With particular reference to FIG. 4a, it can be seen that for a composition having carbon particles present within the range of from about 15% to about 20% by weight, the extrudate exhibits a volume resistivity of about $10^{11}$ ohm-cm before cross-linking and annealing according to the method of FIG. 3. As the temperature is increased to near the melting point $T_m$ of the composition, the observed volume resistivity decreases along path A. A subsequent return to near room temperature (25° C.) $T_r$ results in a drastic reduction in volume resistivity due to the relaxation of the crystalline matrix relieving the stresses imparted during extrusion of the composition. This "hysteresis" type event taking place in FIG. 4a is explained as the relaxation of polymer orientation and stress resultant from the extrusion process. Curves A and B in FIG. 4a are typical of compositions having carbon particles present within the range of from about 15% to about 20% by weight as the temperature is increased to at or near the melting point $T_m$, with no voltage applied across conductors 104 and 106.

After "annealing" according to FIG. 4a, but before the cross-linking step 150 of FIG. 3, the typical PTC composition exhibits the behavior illustrated in FIG. 4b as power is supplied to conductors 104 and 106 as by a variable voltage source. From FIG. 4a, at room temperature (70° C.) $T_r$, the volume resistivity of the composition is somewhere near 1000 ohm-cm and increases along path C in FIG. 4b, with increasing voltage. Path C illustrates the desirable positive temperature coefficient behavior needed for applications as taught by the prior art. The PTC behavior ends at point $T_m$, $R_p$ whereupon the volume resistivity of the composition plummets while the temperature increases along path D. The path D illustrates a negative temperature coefficient which in most typical applications is highly undesirable. When the temperature of the composition exceeds the melting point $T_m$, and the applied voltage is reduced to zero, the composition exhibits a return to an even lower volume resistivity along path E, until at room temperature $T_r$, the volume resistivity is about 10 ohm-cm. As in FIG. 4a, the characteristic electrical behavior illustrated in FIG. 4b is irreversible for the prior art devices having compositions described above.

Temperature sensing cables, Samples A-D, comprise a composition made in accordance with the method of the present invention as illustrated in FIG. 2. The ingredients and relative proportions thereof for said semi-conductive composition Samples A-D are given in Table I below.

TABLE I

| | Ingredients for Samples A-D | | | |
|---|---|---|---|---|
| Ingredients | Sample A wt % | Sample B wt % | Sample C wt % | Sample D wt % |
| High-density polyethlyene (Union Carbide DGDJ3364) | 46.6% | 54.5% | | |
| Ethylene-vinyl acetate | 19.5% | 16.3% | | |

TABLE I-continued

| Ingredients | Ingredients for Samples A-D | | | |
| --- | --- | --- | --- | --- |
| | Sample A wt % | Sample B wt % | Sample C wt % | Sample D wt % |
| (DuPont Elvax-460) | | | | |
| ETFE-ethylene tetra fluoro ethylene (DuPont Tefzel HT 2010) | | | 72.5% | 62.4% |
| vinylidene fluoride hexafluoropropene (A-35 Viton) DuPont | | | | 15.6% |
| Carbon Black (Cabot Vulcan XC-72) | 15% | 12.8% | 7.5% | 8% |
| Zinc oxide | 20% | 16.2% | 20% | 14% |
| linear resistance at 3,000 ft. | >2 × 10$^9$ ohm | >2 × 10$^9$ ohm | >2 × 10$^9$ ohm | >2 × 10$^9$ ohm |

The ingredients for the semi-conductive compositions of temperature sensing cable Samples A-D were mixed with a Banbury mixer according to normal polymer mixing techniques. The heating cables were extruded with an extruder having a 2.5 inch diameter barrel and a length over diameter ratio of about 24 to 1.

The temperature sensing cables were produced by extruding the polymer composition onto and between two parallel 16 AWG conductors. Generally accepted polyethylene extrusion techniques were used. The material between the conductors was approximately 0.076 inch thick and the conductors were spaced 0.220 inches apart.

Although the relative properties of the conductive particles are set forth with specificity by weight in Table I, it is to be appreciated by those of ordinary skill in the art that the ingredients may be varied, while yet obtaining the advantageous results of the present invention particularly illustrated in the figures, with a corresponding adjustment in the compounding process.

In general, the resistivity of the extrudate is a function of numerous variables including, but not necessarily limited to, duration of mixing, type of mixing apparatus, temperatures, and other factors of the mixing cycle.

Imparting a low level of work into the mixture so as to disperse the carbon black/fillers throughout the composition, by virtue of the compounding process, causes the resistivity of the extrudate to decrease.

Along those lines, a prolonged mixing time (work imparted) results in a reduced flocculation of carbon black particles (greater dispersion) with commensurate increase in the resistivity of the extruded composition. Similarly, stresses imparted into the polymer mixture due to extrusion through a long-land die will result in greater composition resistivity.

Overall then, adjustments in the compounding process of the preferred embodiment as well as in the relative ratios of conduction particles added to the polymer (Table I) are possible while simultaneously achieving the characteristic behavior of the invention as shown in the figures.

Figure 5A:
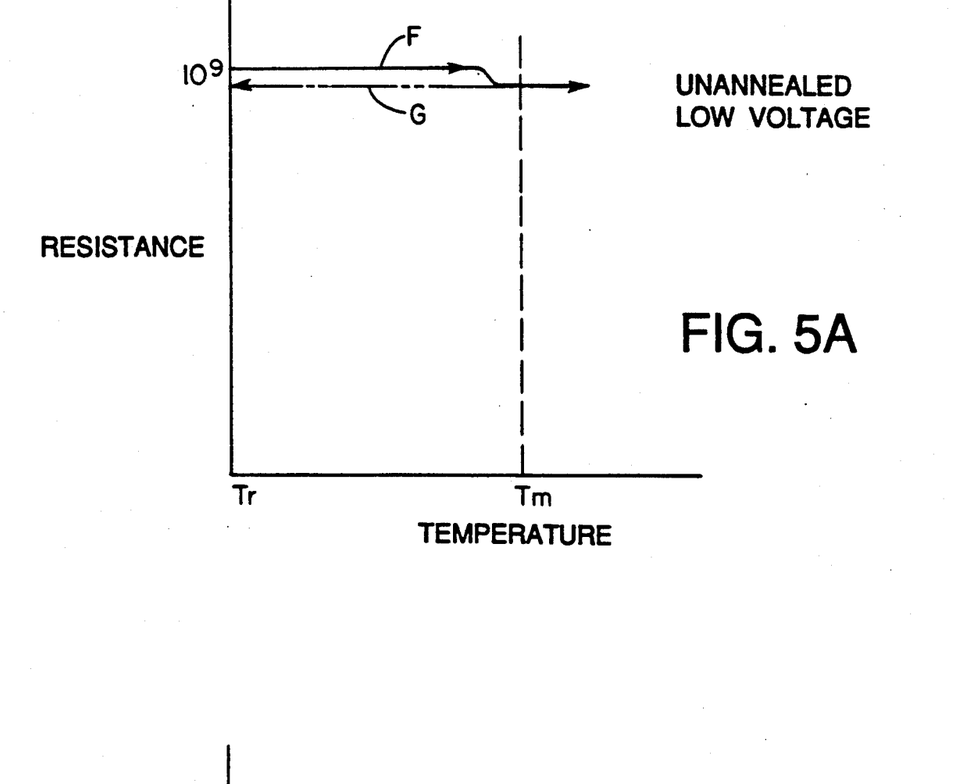
FIGS. 5a and 5b are graphs of averaged electrical characteristics of a continuous temperature sensing cable made in accordance with the present invention and according to the method illustrated in FIG. 2.
Figure 5B:
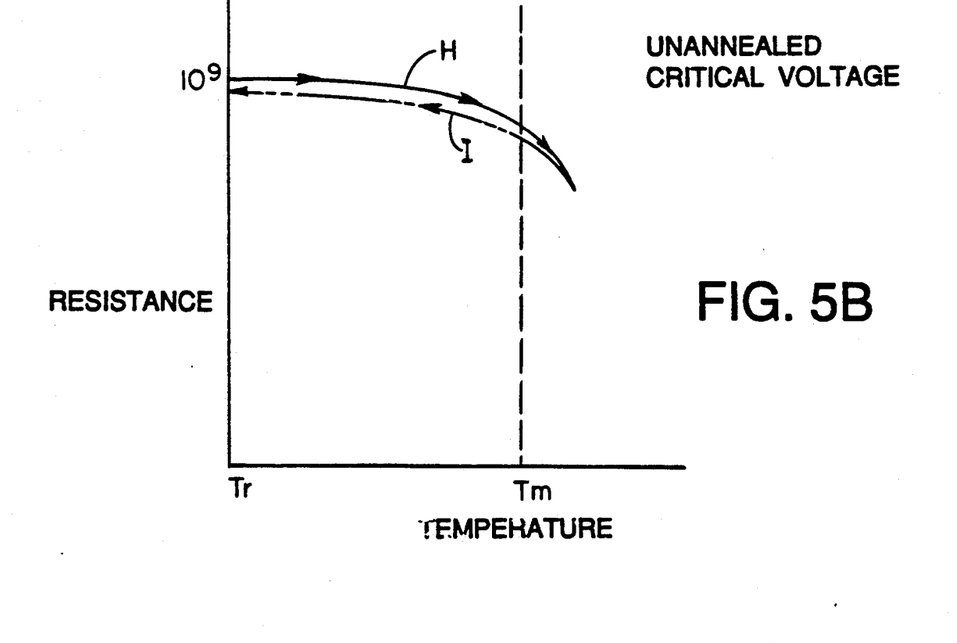

The average electrical resistance characteristics of selected lengths of the Samples A-D were measured to determine the electrical properties thereof. Referring first to FIGS. 5a and 5b, but with particular reference to FIG. 5a, at room temperature $T_r$, the average linear resistance of the composition Samples A-D was found to be about $2 \times 10^9$ ohm for a 3,000 foot section. A low voltage of about 2 volts DC/AC was applied to a selected length of the temperature sensing cable of about 50 feet. Next the temperature was increased to at or near the melting point $T_m$ with the observed slight decrease in linear resistivity along path F. The selected length of sensing cable was then allowed to cool again to room temperature $T_r$, whereupon the path G represents the average resistance characteristics of the construction as the Samples cooled. As can be seen from the FIGURE, the "hysteresis" loss in linear resistivity is negligible, due to the relatively small amounts of conductive particles disposed in the polymeric matrix according to Table I. Generally, while at voltages of less than 2 volts DC or AC, the conductive network formed within the polymer is much less structured than compositions having a greater amount of conductive particles by weight (greater than 15%) and hence, the resistance characteristic for Samples A-D is reversible upon cooling of the plastic from melting point to room temperature.

With particular reference now to FIG. 5b, a fixed higher voltage (120 volts AC at 60 Hz) was applied to a 5 foot length of the temperature sensing cable made in accordance with FIG. 2. From the FIGURE, it can be seen that again only a slight hysteresis loss in linear resistivity is noticed for one cycle from room temperature to the melting point temperature $T_m$ along path H and back again, along path I. Again, because of the relatively slight amounts of conductive particles impregnated within the polymer, the conductive network formed is reversible upon cooling the plastic to below its melting point temperature $T_m$.

Comparison between FIGS. 5a and 5b illustrates that at the melt temperature $T_m$, a relatively high voltage (120 VAC in FIG. 5b) must be applied to cause the declination in the resistance curve plotted in FIG. 5b. This phenomenon has been labeled "tunneling conduction" and is generally described in *Carbon Black—Polymer Composites: The Physics of Electrically Conducting Composites*. Edited by Enid Keil Sichel, ISBN 0-8247-1673-6, Chapter 2, which disclosure is incorporated herein by reference.

Figure 6A:
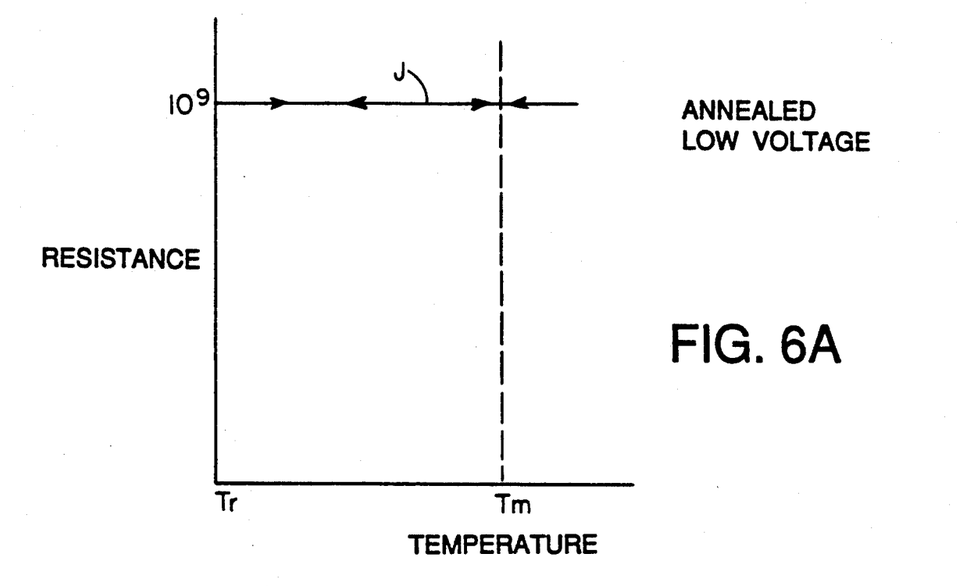
FIGS. 6a and 6b are graphs of averaged electrical characteristics of the continuous temperature sensing cable made in accordance with the present invention and according to the method illustrated in FIG. 2 with an additional step of post-extrusion annealing.
Figure 6B:
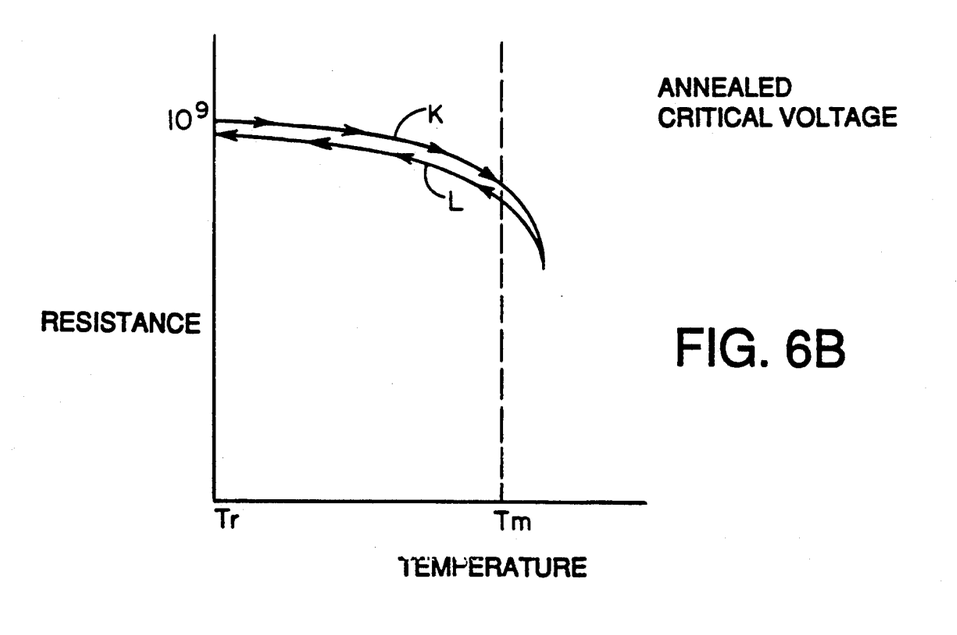

FIGS. 6a and 6b represent the average characteristics of Samples A-D made in accordance with the steps of FIG. 2, but with an additional annealing step. The samples were annealed at a temperature of 300° F. and for a period of one hour. The average electrical resistance characteristics of Samples A-D were measured to determine the electrical properties thereof.

Referring first to FIG. 6a, at room temperature $T_r$, the linear resistance of the composition was found to be about $2 \times 10^9$ ohm (essentially the resistance of the polymer matrix itself). A fixed low voltage of about 2 volts DC/AC was applied to the selected length of temperature sensing cable. Next, the temperature was increased to at or near the melting point $T_m$ with the observed decrease in linear resistivity along path J. The test length of sensing cable was then allowed to cool again to room temperature $T_r$, whereupon the path J represents the average resistance characteristic behavior of the construction as it cooled. As can be seen from the FIGURE, the "hysteresis" loss in linear resistivity is negligible, due to the relatively small amounts of conductive particles disposed in the polymeric matrix. Generally, while at voltages of less than 2 volts dc or ac, the conductive network formed within the polymer is much less structured than compositions having a greater amount of conductive particles by weight (greater than 15%) and hence, the resistance characteristic is reversible upon cooling of the plastic from melting point to room temperature.

With particular reference now to FIG. 6b, a higher voltage (120 volts AC at 60 Hz) was applied to the test length of the temperature sensing cable Samples made in accordance with FIG. 2. From the FIGURE, it can be seen that again only a slight hysteresis loss in linear resistivity is noticed for one cycle from room temperature to the melting point temperature $T_m$ along path K and back again, along path L. Again, because of the relatively slight amounts of conductive particles impregnated within the polymer, the conductive network formed is reversible upon cooling the plastic to below its melting point temperature $T_m$. As in FIG. 5b, the declination is pronounced due to the tunneling conduction upon application of the electric field at elevated temperatures.

Figure 7:
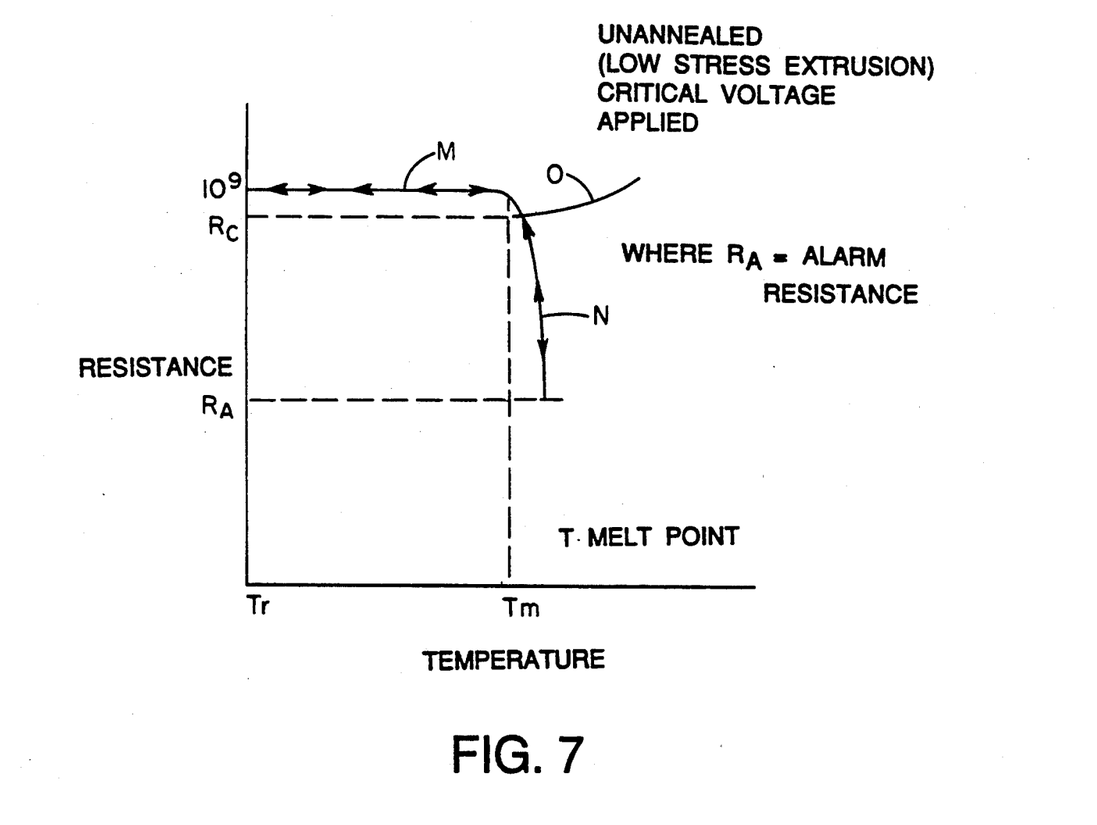
FIG. 7 is a graph of averaged electrical characteristics of the continuous temperature sensing cable material made in accordance with the present invention when unannealed and in part having a critical voltage applied; and, FIGS. 8a and 8b are diagrammatical illustrations of the continuous temperature sensing cable of the present invention used with fire detecting equipment including a DC dual-mode alarm system and a time domain reflectometer system respectively.

Referring now to FIG. 7, the average resistance versus temperature curves of Samples A-D is illustrated. The Samples formed were in accordance with the method FIG. 2, but with the extrusion step being a low-stress extrusion. A low-stress extrusion is one utilizing a short land die heated above the barrel melt temperature of the polymer followed by a slow cooling of the extrudate through its crystalline melting point. The short land die minimizes orientation. A hot water bath is commonly used to control the cooling rate of the extrudate. At room temperature $T_r$, the average linear resistivity is about $10^9$ ohm/ft. In accordance with the preferred embodiment, a critical voltage of about 40 VDC may be applied to the conductors 104 and 106 of the temperature sensing cable 100 to effect the tunneling conduction.

At low temperatures, the continuous length of temperature sensing cable appears to be an open circuit, the composition 108 acting as an insulator. Upon heating the cable beyond its melting point $T_m$, the linear resistance follows path N until it reaches a predetermined critical resistance $R_c$ (about $1 \times 10^6$ ohms). Further increase in temperature beyond the melt temperature $T_m$ only results in destruction of the test cable, but with no observable affect on the overall resistivity which remains at the critical resistance $R_c$.

As indicated above, an electric field may be applied to the conductors within the cable when at or above the melt temperature $T_m$ to initiate tunneling conduction observable as the declination plotted in the FIGURE as path N. Experimentation shows that the mechanism for this behavior of the system of the preferred embodiment is controlled exclusively by the applied electric field. For a given filler content, a low voltage applied above the melting point does not cause a resistance change. That is, for an applied voltage below the critical voltage (less than 40 volts for Samples A-D) the resistance behavior of the temperature sensing cable follows path O (exaggerated in the FIGURE) above the melting point. However, when the critical voltage (about 40 volts) is applied to the conductors 104 and 106 above the composition melt temperature $T_m$, a negative temperature coefficient of electrical resistance is observed along path N. In either case, FIG. 7 illustrates that the overall cable resistance is reversible when the cable is permitted to return to room temperature absent total physical destruction as by incineration.

Figure 8A:
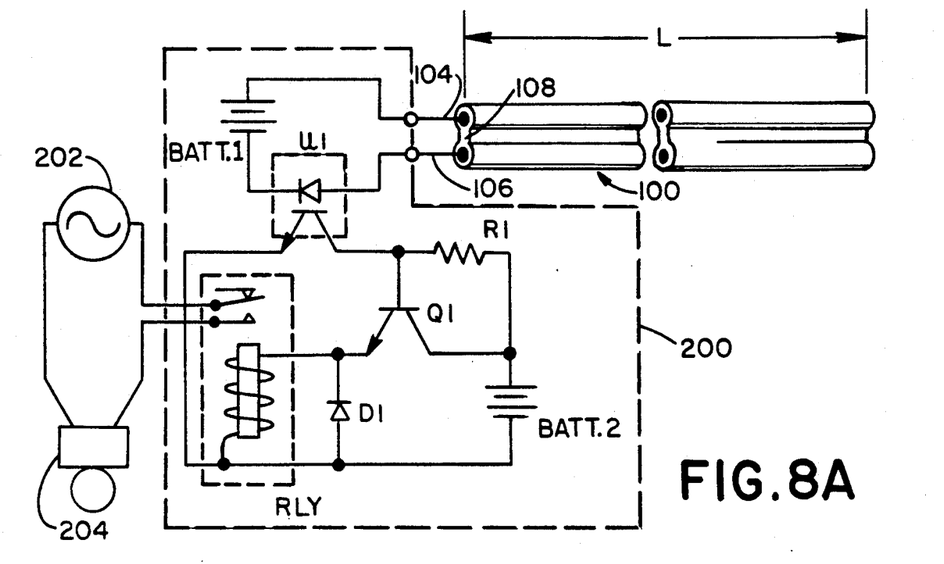
Figure 8B:
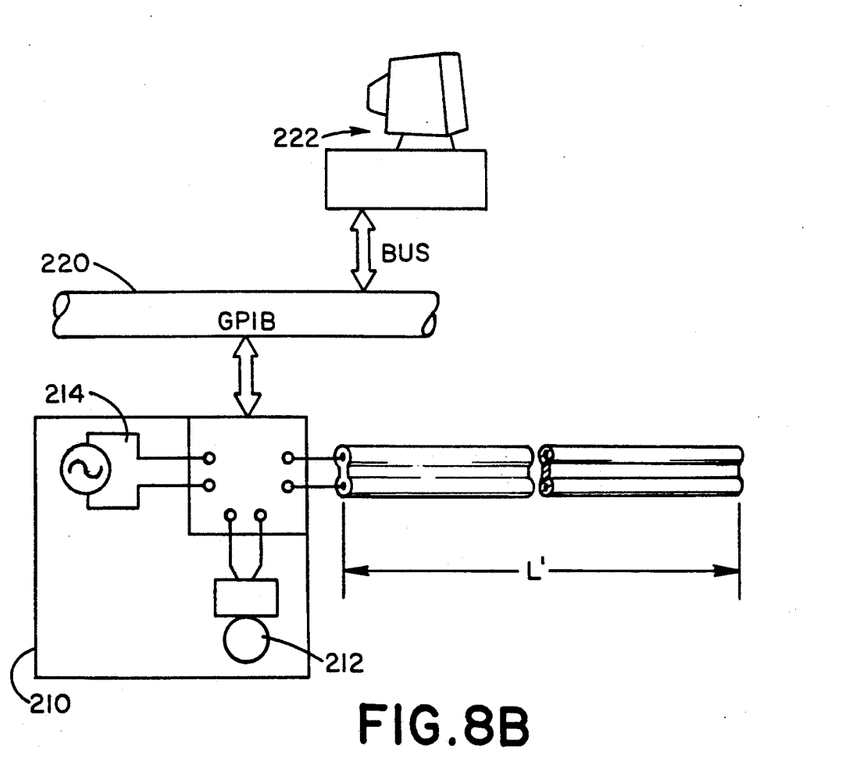

FIGS. 8a and 8b illustrate two applications of the continuous temperature sensing cable made in accordance with FIG. 2 and using the ingredients of Table I.

Referring first to FIG. 8a, the temperature sensing cable 100 is shown connected to an electronic control and alarm apparatus 200 through conductors 104 and 106. The controller/alarm 200 comprises a first voltage source BAT1, and a second voltage source BAT2. An optical isolator U1 comprising a LED/phototransistor pair senses current flowing through the temperature sensing cable 100. Under normal operating conditions, current does not flow through the LED within the optical isolator U1 until the temperature sensing cable 100 experiences a local high temperature as would be produced by a fire or the like in conjunction with an applied electric field. The voltage level of the power source BAT1 is selected to be the critical voltage of 40 volts in the preferred embodiment. As such, should a localized melting of the temperature sensing cable 100 occur somewhere over the length L, the isolator U1 will urge transistor Q1 into conduction, causing the contacts of the relay RLY to close. This in turn connects power source 202 to an alarm 204, such as a bell or the like. The length L of the temperature sensing cable 100 may be extremely long (3000 feet as an example). Under normal operating conditions, the composition 108 acts as an insulator. Only under conditions of localized elevated temperatures above the melting point $T_m$ of the composition are the conductors 104 and 106 in electrical communication with each other. As such, the voltage level of the power source BAT1 should be selected to account for the voltage drop due to the inherent resistance of the conductors 104 and 106 themselves for given length L of the temperature sensing cable 100. In this manner, overheat conditions may be monitored/detected throughout the length of even extremely long cables.

The embodiment of FIG. 8a may be installed in commercial or residential buildings such as apartments or the like as a fire alarm system. Features of this embodiment include the single-ended monitor/control expedient and the ability to add additional sensing cable to the open end as needed.

Next referring to FIG. 8b, a second embodiment of an extreme heat sensing system is shown utilizing a time-domain reflectometer 210. A time domain reflectometer TDR is an instrument designed to measure reflection characteristics of a transmission system connected to the instrument by monitoring the step-formed signals, initiated by a signal generator 214, entering the test object and the superimposed reflected transient signals on an oscilloscope 212 or similar equipment with a suitable time-base sweep. Through the use of the time domain reflectometer 210, local continuities, due to an overheat (at or near melt temperature) condition, throughout the length L' of the continuous temperature sensing cable 100 made in accordance with the present invention may be pinpointed with extreme accuracy. Through this expedient, a building having numerous individual rooms may be monitored using a single continuous temperature sensing cable. Should a fire or similar catastrophe occur in a single room, the localized continuity created by the decrease in resistance at the scene of the fire wherein the cable 100 is exposed to temperatures greater than the melting point $T_m$ may be identified. The applied step-formed signals are selected to be of sufficient magnitude to cause tunneling conduction at the local overheat site.

The time domain reflectometer 210 may be connected to a general purpose interface bus GPIB 220 and, in turn, to a host supervisor computer 222 which may issue an alarm and continuously monitor the overall system according to a stored program algorithm.

The invention has been described with reference to the preferred embodiments. Modification and alterations will occur to others upon reading and understanding of this specification. It is my intention to include all such modifications and alterations insofar as they come within the scope of the appended claims or equivalents thereof.

Having thus described the invention, I now claim:

1. A method of remote overheat detection of an area for use with an elongate temperature sensing cable formed of i) a polymeric composition having a negative temperature coefficient characteristic when above an anomaly temperature and ii) at least two spaced-apart electrical conductors electrically interconnected by means of the composition, the method comprising the steps of:
   extending a predefined length of the electrical temperature sensing cable in said area;
   applying an electric field to at least a portion of the composition in the area;
   detecting tunneling conduction current flow through the composition in a presence of the overheat condition above said anomaly temperature; and,
   generating current flow is detected.

2. The method according to claim 1 further comprising applying the electric field to the composition in said area for the entire predefined length of said cable.

3. The method according to claim 2 further comprising applying the electric field to the composition through the at least two spaced-apart electrical conductors for the predefined length of said cable.

4. The method according to claim 3 further comprising applying the electric field to the at least two spaced-apart electrical conductors at a single end of the cable.

5. The method according to claim 4 wherein the step of applying the electric field comprises applying step-formed signals to the at least two-spaced apart electrical conductors.

6. The method according to claim 5 further comprising the steps of:
   detecting a local continuity along the predefined length of the cable as a reflected transient signal; and,
   generating the alarm signal when the reflected transient signal is detected.

7. The method according to claim 4 further comprising the step of sensing a decrease in the tunneling conduction current i) as the temperature in said area decreasingly passes through said anomaly temperature and ii) in the presence of said applied electric field.

8. A method of remote overheat detection of an area for use with an elongate temperature sensing cable formed of a composition having at least one polymeric component and an amount of electrically conductive particles therein to promote a negative temperature coefficient characteristic of the composition when above an anomaly temperature and in a presence of an electric field sufficient to promote tunneling conduction current in said composition, the method comprising the steps of:
   extending a predefined length of the electrical temperature sensing cable into said area;
   applying said electric field to at least a portion of the composition in the area;
   detecting the tunneling conduction current flow through the composition in a presence of the overheat condition above said anomaly temperature; and,
   generating an alarm signal when the tunneling conduction current flow is detected.

9. The method according to claim 8 further comprising the steps of:
   providing at least two spaced-apart electrical conductors electrically interconnected for said predefined length of the cable by means of the composition; and,
   applying the electric field to the composition through the at least two spaced-apart electrical conductors for the predefined length of said cable.

10. The method according to claim 9 further comprising applying the electric field to the at least two spaced-apart electrical conductors at a single and of said elongate temperature sensing cable.

11. The method according to claim 10 wherein the step of applying the electric field comprises applying an electrical signal of short duration to the at least two spaced-apart electrical conductors.

12. The method according to claim 11 further comprising the steps of:
   detecting a local continuity along the predefined length of the cable as a reflected transient signal; and
   generating the alarm signal when the reflected transient signal is detected.

13. The method according to claim 8 further comprising the steps of:
   sensing a decrease in the tunneling conduction current i) as the temperature in said area decreasingly passes through said anomaly temperature and ii) in the presence of said applied electric field; and,
   extinguishing said alarm signal responsive to the sensed decrease.

14. An overheat alarm system for detecting an overheat condition in an area, the system comprising:
   an elongate temperature sensing cable extended over a first length in said area, the cable being formed of a composition having at least one polymeric component and an amount of electrically conductive particles therein to promote a negative temperature coefficient characteristic of the composition when above an anomaly temperature and in the presence of an electric field sufficient to promote tunneling conduction current in said composition;
   at least two electrical conductor means for conducting electrical current, the at least two electrical conductor means being electrically interconnected by said composition;
   supply means for applying said electric field through the at least two electrical conductor means to at least a portion of the composition in the area;
   tunneling current detecting means for detecting a tunneling conduction current flow through the composition in a presence of the overheat condition above said anomaly temperature in said area; and,
   alarm generating means for generating an alarm signal when the tunneling conduction current flow is detected.

15. The overheat alarm system according to claim 14 wherein said at least two electrical conductor means include means for applying the electric field to the composition in said area for the entire first length of said elongate temperature sensing cable.

16. The overheat alarm system according to claim 15 wherein said at least two electrical conductor means are disposed in a spaced-apart parallel relationship within said composition for the length of said cable.

17. The overheat alarm system according to claim 15 wherein the supply means includes means for applying a step-formed electrical signal to a single common end of the at least two electrical conductor means.

18. The overheat alarm system according to claim 15 further comprising:
   means for detecting a local continuity along the first length of the cable as a reflected transient signal; and,
   means for generating the alarm signal when the reflected transient signal is detected.

19. The overheat alarm system according to claim 14 further comprising: means for sensing a decrease in the tunneling conduction current i) as the temperature in said area decreasingly passes through said anomaly temperature and ii) in the presence of said applied electric field; and, means for extinguishing said alarm signal responsive to the sensed decrease.

20. An overheat alarm system comprising:
   a temperature sensing element having a negative temperature coefficient of electrical resistance above an anomaly temperature, the element comprising:
      a composition exhibiting reversible electrical behavior, the composition containing at least one polymeric component and an amount of blended electrically conductive carbon black and zinc oxide particles therein to promote a reversible negative temperature coefficient characteristic of the composition when above the anomaly temperature and in a presence of an electric field sufficient to promote conduction in said composition; and,
      at least two electrical conduction means, electrically interconnected through the composition, for conducting electric current in said temperature sensing element;
   supply means for applying said electric field to said at least two electrical conduction means;
   tunneling current detecting means for detecting a tunneling conduction current flow through the composition in a presence of the overheat condition above said anomaly temperature; and,
   alarm generating means for generating an alarm signal when the tunneling conduction current flow is detected.

21. The overheat alarm system according to claim 20 wherein the amount of said electrically conductive particles in said composition is controlled within the range of seven and one half percent to fifteen percent by weight to the total weight of said composition.

22. The overheat alarm system according to claim 21 wherein said anomaly temperature is the melt temperature of the composition.

* * * * *